United States Patent
Torgeson

[19]

[11] Patent Number: 6,157,402
[45] Date of Patent: Dec. 5, 2000

[54] AUTOSTEREOSCOPIC IMAGE PRESENTATION SYSTEM USING A SCREEN ASSEMBLY

[76] Inventor: W. Lee Torgeson, 1124 Lindendale Dr., Pittsburgh, Pa. 15254

[21] Appl. No.: 09/018,994

[22] Filed: Feb. 5, 1998

Related U.S. Application Data

[60] Provisional application No. 60/040,299, Feb. 13, 1997.

[51] Int. Cl.$^7$ .................................................. H04N 13/00
[52] U.S. Cl. .................................. 348/59; 348/42; 348/51
[58] Field of Search .................................. 348/42, 46, 47, 348/51–59; 349/15, 61, 95, 112; 359/462–464, 466, 619; H04N 13/00

[56] References Cited

U.S. PATENT DOCUMENTS

| | | | |
|---|---|---|---|
| 4,717,949 | 1/1988 | Eichenlaub | 348/54 |
| 4,829,365 | 5/1989 | Eichenlaub | 358/3 |
| 4,987,487 | 1/1991 | Ichinose et al. | 348/42 |
| 5,036,385 | 7/1991 | Eichenlaub | 348/59 |
| 5,083,199 | 1/1992 | Börner | 358/88 |
| 5,132,839 | 7/1992 | Travis | 359/463 |
| 5,311,220 | 5/1994 | Eichenlaub | 348/55 |
| 5,349,379 | 9/1994 | Eichenlaub | 348/59 |
| 5,392,140 | 2/1995 | Ezra et al. | 349/15 |
| 5,457,574 | 10/1995 | Eichenlaub | 359/462 |
| 5,465,175 | 11/1995 | Woodgate et al. | 359/463 |
| 5,500,765 | 3/1996 | Eichenlaub | 359/463 |
| 5,521,724 | 5/1996 | Shires | 359/22 |
| 5,614,941 | 3/1997 | Hines | 348/2 |
| 5,629,797 | 5/1997 | Ridgway | 359/464 |

*Primary Examiner*—Richard Lee
*Attorney, Agent, or Firm*—Kenyon & Kenyon

[57] ABSTRACT

A system for producing stereoscopic television images enables viewers to discriminate between left and right scan lines, as displayed on the television screen, by virtue of the binocular parallax of human vision. The viewer can perceive a three-dimensional image without the need to wear any sort of specially designed eye-glasses. A screen assembly which can be used with a computer monitor to provide stereoscopic views derived either from stereoscopic multimedia inputs or computer generated stereoscopic images. Because viewers of these displays perceive left-hand views on the display solely with the left eye and right-hand views solely with the right eye, the perceived result is a three-dimensional image.

22 Claims, 12 Drawing Sheets

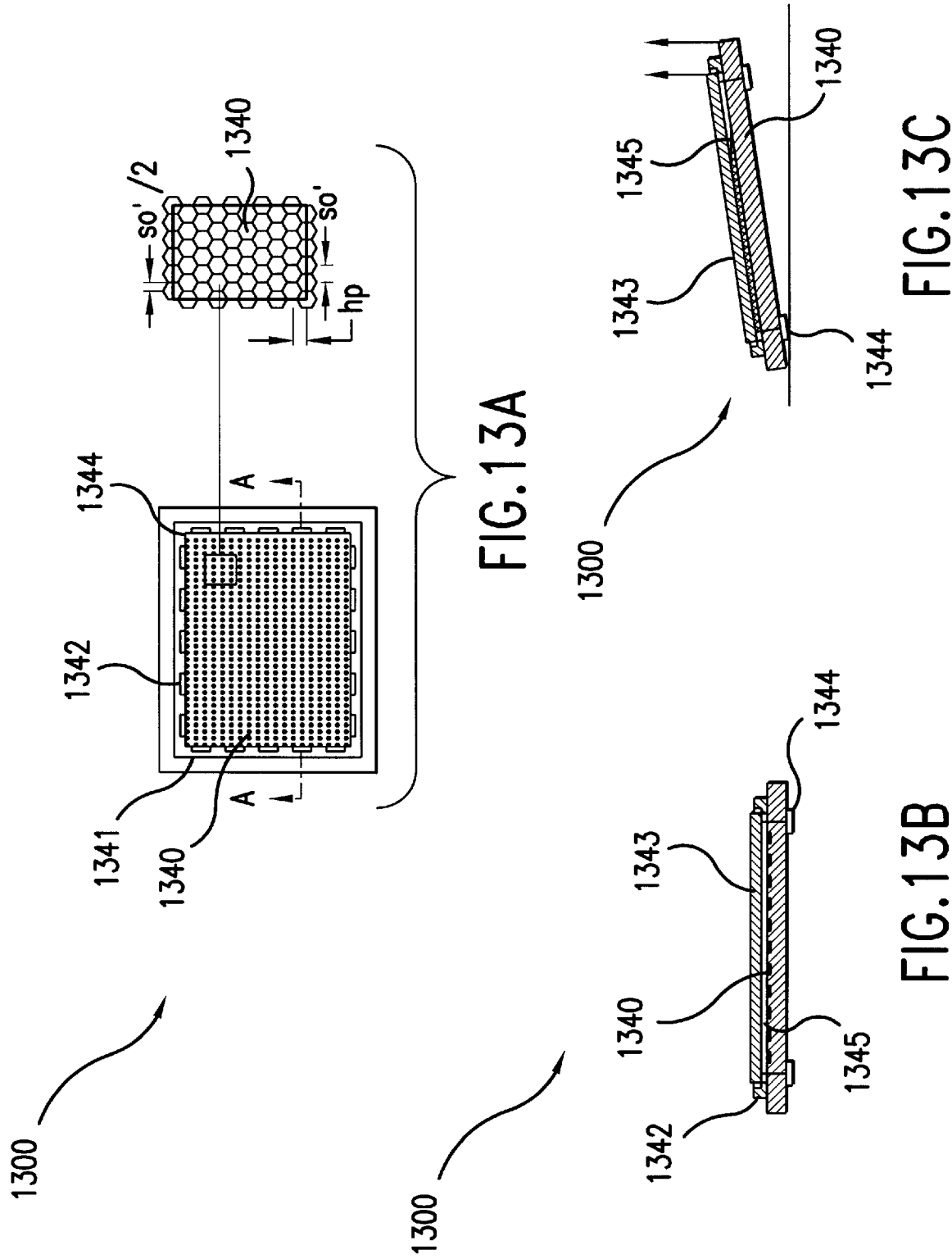

AUTOSTEREOSCOPIC IMAGE PRESENTATION SYSTEM USING A SCREEN ASSEMBLY

CROSS-REFERENCES TO RELATED APPLICATIONS

This application claims the benefit of U.S. Provisional Application No. 60/040,299, filed Feb. 13, 1997, the entire contents of which are incorporated herein by reference.

BACKGROUND OF THE INVENTION

The present invention relates to stereoscopic image presentation in general, and in particular to an autostereoscopic image presentation system which does not require the viewer to wear special eye-glasses.

With the advent of digital television and the widespread use of cable and satellite transmission, monoscopic television technology is approaching a very high state of development. High Definition Television, although not widely available in 1997, has significantly improved television picture quality. Nonetheless, the ultimate realism obtainable by stereoscopic viewing is presently possible only with anaglyphic systems, which require special glasses to separate the left- and right-hand views of a stereoscopic program.

Lack of acceptance of anaglyphic 3-D TV by the general public has led to significant efforts to develop autostereoscopic television systems. For example, U.S. Pat. No. 5,614,941 issued to Hines discloses an autostereoscopic television system employing multiple (generally more than two) different views of the subject, which are processed to produce a 3-D presentation. U.S. Pat. No. 5,349,379 issued to Eichenlaub makes use of head position sensors in processing stereoscopic video images to enable one or more observers to view 3-D displays. in U.S. Pat. No. 4,829,365, Eichenlaub describes a flat liquid crystal display employing equally spaced vertical light sources, disposed behind a liquid crystal display. The display contains left-eye and right-eye information in alternating segments within each horizontal display lines. The vertical light source elements illuminate each left-eye and right-eye information segment to produce autostereoscopic viewing.

Holographic television concepts are under development at the Massachusetts Institute of Technology (MIT) by Benton, and others. The results to date are very computation intensive and result in displays about 4"×4"×4" in size or smaller. U.S. Pat. No. 5,521,724 issued to Shires discloses an auto-multiscopic 3-D system based on HOE's (Holographic Optical Elements).

Known systems based on the parallax barrier concept, however, suffer several shortcomings. First, over half of the light from the monitor screen is blocked. Second, these symptoms impose very severe limitations of head position for stereoscopic viewing. Third, problems exist due to diffraction effects, which often lead to highly objectional diffraction bands.

SUMMARY OF THE INVENTION

The embodiments of the present invention are compatible with existing and projected television systems that produce video pictures by scanning techniques. The autostereoscopic concept described herein employs a scanning technique in which successive scan lines alternate between a left- and right-hand view of a scene. This condition already exists for stereoscopic videos employing the NTSC standard. In the case of the new digital standards, which are likely to specify progressive scanning, scan lines generated by two stereoscopic cameras can be switched line-by-line to produce the same result.

A screen assembly allows a viewer, having an interpupillary distance E and being located a distance L from an intermediate screen of the screen assembly, to view stereoscopic images displayed on a video display. The video display has interlaced scan lines extending in a horizontal direction and interlaced in a vertical direction, where alternating scan lines carry left eye and right eye information. The screen assembly comprises a first panel, the intermediate screen and a second panel.

The first panel has a first set of lenslet rows and a second set of lenslet rows. The first set of lenslet rows is interleaved with the second set of lenslet rows by an offset $s_o/2$. Each lenslet row has a plurality of lenslets; each lenslet has a width $s_o$ in the horizontal direction and a height $h_p$ in the vertical direction. The height $h_p$ corresponds to a height of one scan line of the video display.

The intermediate screen is spaced from the first panel by a spacing m in a depth direction that is orthogonal to the vertical direction and the horizontal direction. The first panel is disposed between the intermediate screen and the video display. A plurality of dots are formed on the intermediate screen by the lenslets of the first panel focussing the stereoscopic images of the video display, adjacent dots being separated by a spacing $s_o'$.

The second panel has a first optical transmittance and a set of lines having a second smaller optical transmittance. The set of lines (i) have a width w in the horizontal direction, and (ii) are equally spaced from one another in the horizontal direction by a spacing s'.

The dimensions of the screen assembly satisfies the equations:

$$s' = s_o'(1 - T/L),$$

$$T = s_o' L/(2E),$$

$$w = s_o/2.$$

Consequently when the screen assembly is disposed between the video display and the viewers, the lenslets and the lines cooperate to allow the viewers to see with their right eye and to not see with their left eye particular dots containing right eye information, and to allow the viewers to see with their left eye and to not see with their right eye particular dots containing left eye information.

The present invention accommodates substantial lateral head movements on the order of 1.5" by individual viewers; also, movement beyond these limits simply reverses the stereoscopic image, yielding a "pseudostereoscopic" picture which in turn can be viewed over a comparable range of head positions.

Lateral displacement of the viewer by a distance x restores the original stereoscopic view of the screen. To be specific, if the screen is viewed from a position A affording full stereoscopic separation, a viewer can move laterally from this position by a distance: $x = (s'/s_o)(2E)$ and restore the original view (E is the human eye spacing—about 2.5").

In some embodiments of the present invention, the width of the lenslet, $s_o$, on the first panel is different than the spacing of the adjacent dots, $s_o'$, formed on the intermediate screen by the lenslets of the first panel. For example, where stereoscopic images are projected on the lenslet screen by an LCD panel, the dot spacing on the intermediate screen can be slightly greater than $s_o$. In other embodiments of the present invention, the width of the lenslet, $s_o$, on the first panel can be the same as the spacing of the adjacent dots, $s_o'$. The above equations can be adapted to this case by equating $s_o$ with $s_o'$.

BRIEF DESCRIPTION OF THE DRAWINGS

FIG. 13A is plan view of a casting mold for producing lenslet panels.

FIG. 13B is a sectional view of the casting mold and backing panel used for fabricating lenslet panels.

FIG. 13C is a schematic sectional view of the casting mold and backing panel, illustrating the process of filling the mold with casting resin without entrapment of air bubbles.

DETAILED DESCRIPTION

A. General Description of an Embodiment of the Autostereoscopic System of the Present Invention Embodiments of the present invention provides a practicable system for achieving autostereoscopic television. Further, embodiments of the present invention permits multiple viewers of the same display to achieve autostereoscopic viewing of a television program. In addition, embodiments of the present invention provides a technologically feasible method of achieving stereoscopic television in a form compatible with well established NTSC standards and European standards such as PAL as well as new Advisory Committee on Advanced Television Service (ACATS) digital standards. Existing NTSC-based stereoscopic program materials on a standard VCR or laserdisc player can be played. Autostereoscopic viewing of stereoscopic displays, which may be computer-generated or introduced via CD ROM, by on-line inputs or by other means is possible.

Figure 1:
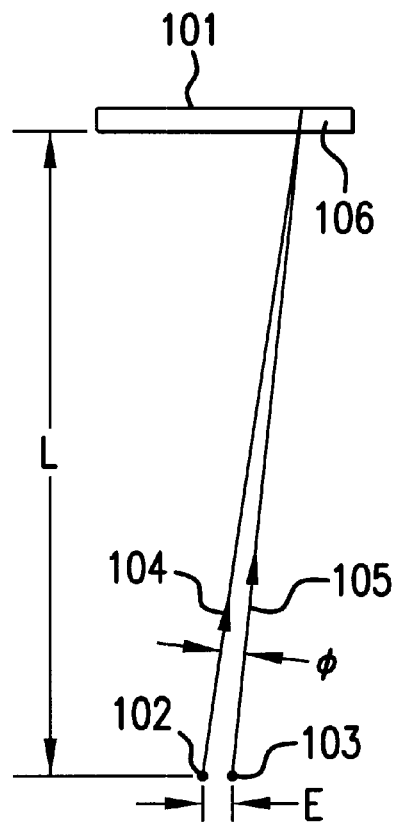
FIG. 1 is a top view of a selection screen illustrating the geometry of the autostereoscopic television system, according to an embodiment of the present invention.

An autostereoscopic viewing system separates the left- and right-eye views of the displayed stereoscopic information, which may be either a static display or a television program. FIG. 1 is a schematic top view of a stereoscopic display on screen 101 with a single viewer located at a distance L from the display screen, according to an embodiment of the present invention. The left eye 102 and the right eye 103 are separated by the interpupillary distance E. The left eye view 104 and the right eye view 105 of a point on screen 101 are shown in FIG. 1. The difference in the angle of view for the two eyes is the parallax angle $\phi$.

The screen assembly 106 described herein enables the separation of the left- and right-eye views of a stereoscopic display on screen 101. The stereoscopic display on screen 101 advantageously allows stereoscopic images to be produced by scanning technology as presently used for television and computer monitors.

Figure 2:
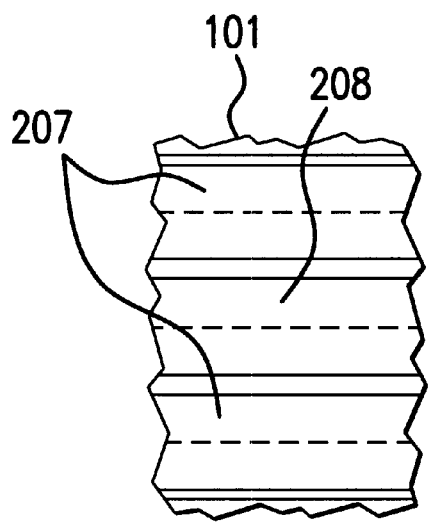
FIG. 2 is an enlarged view of a portion of a face of a monitor screen displaying stereoscopic scanning according to an embodiment of the present invention.

Sequential scan lines displayed on screen 101 can alternate between a right- and left-hand view as illustrated in FIG. 2. Thus, scan lines 207 correspond to left-hand view 104 and scan lines 208 correspond to right-hand view 105. This is already the case for stereoscopic transmissions and/or videos produced in accordance with NTSC standards: currently available stereoscopic videos use field-sequential scanning, with a first field representing the left-hand view, for example, and the second field representing the right-hand view. Because the fields are interlaced, i.e., the first field including odd-numbered scan lines and the second field including even-numbered scan lines, the displayed scan lines will alternate between a left- and right-hand view.

In an alternative embodiment of the present invention, progressive scanning is used. With progressive scanning, the scan lines for a stereoscopic display would simply be programmed to alternate between a left- and right-hand view from line-to-line. New digital television and computer display standards proposed by Advisory Committee on Advanced Television Service (ACATS) envision progressive scanning rather than interlacing, although interlacing remains an option for the new ACATS standards.

A. Embodiments of Projection Systems

Figure 3:
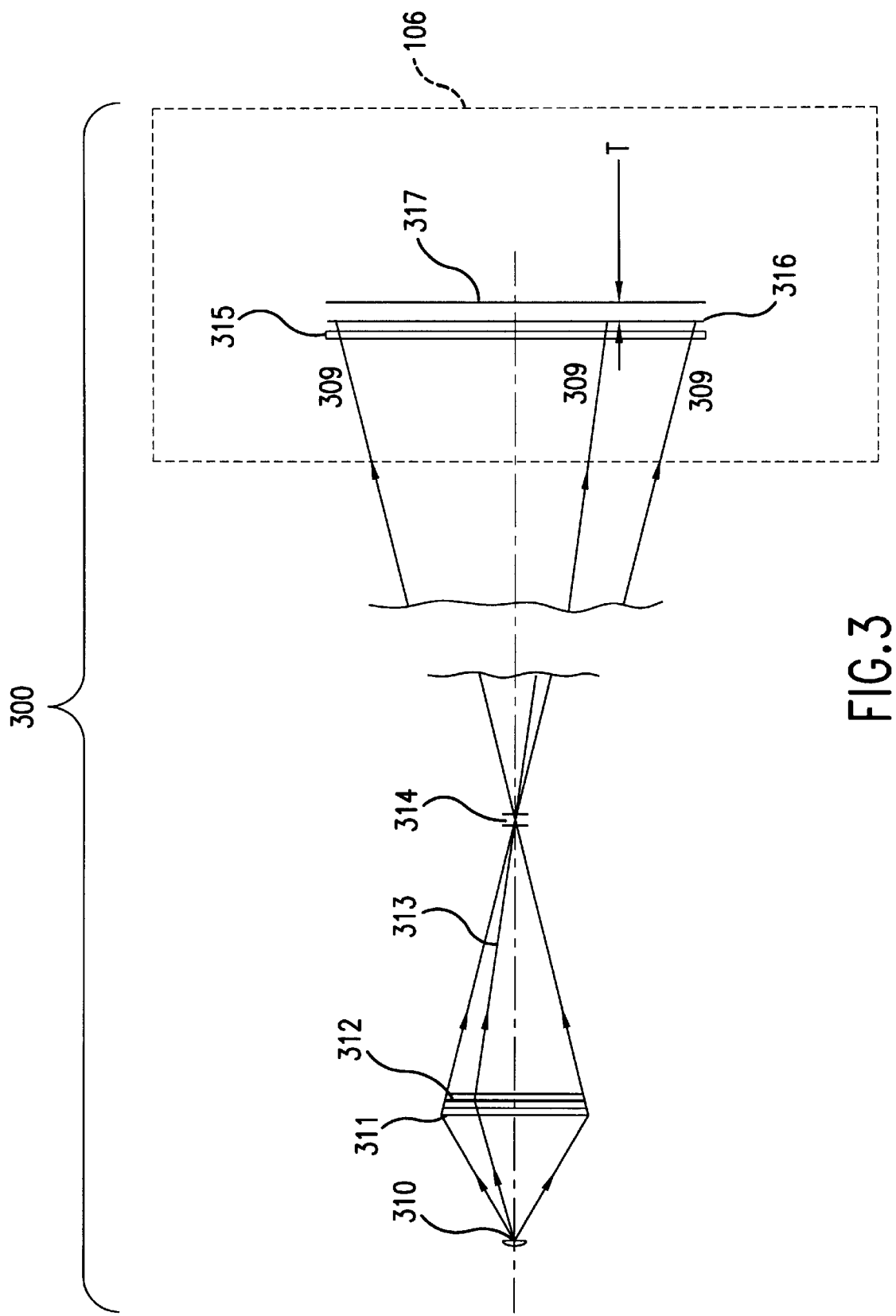
FIG. 3 is a schematic view of an autostereoscopic system based on projection, according to an embodiment of the present invention.

In one embodiment of the invention, a projection system 300 displays video by an LCD panel 312 and projects the video on to screen assembly 106 for viewing, as shown in FIG. 3. Projection system 300 includes screen assembly 106. Screen assembly 106 comprises microlens panel 315, intermediate screen 316 and analyzing panel 317. A high-intensity light source and reflector 310 directs light to condenser lens assembly 311 (e.g., two back-to-back Fresnel lenses). After passing through LCD panel 312, light is focused toward the projections lens system 314, which in turn focuses an enlarged image of LCD panel 312 on microlens panel 315. Light 309 impinging on each microlens element is converged and focused on intermediate screen 316. Stereoscopic separation is obtained by viewing intermediate screen 316 through analyzing panel 317, viewers (not shown) being located at a distance L to the right of screen 316.

Figure 4:
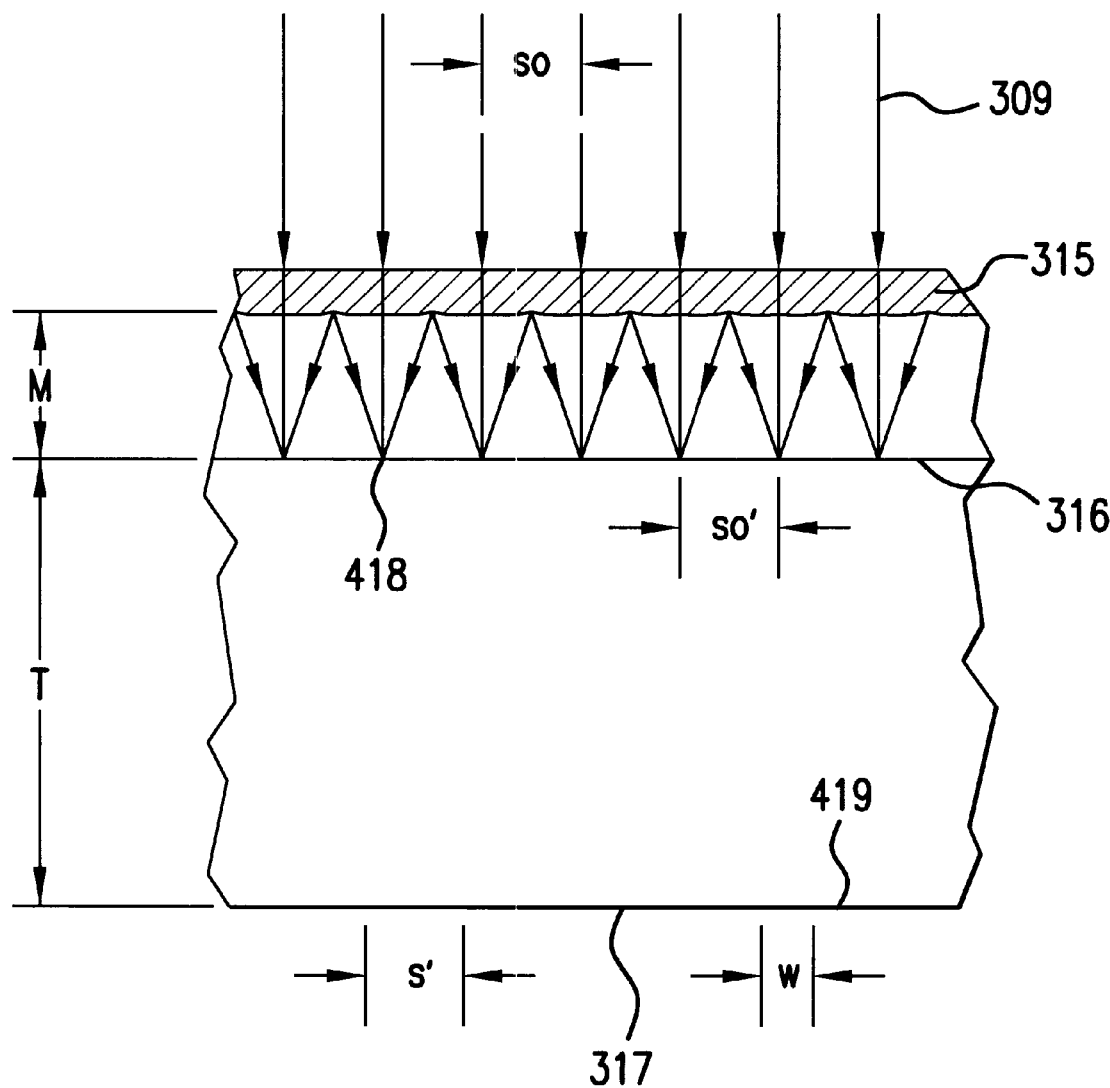
FIG. 4 is a schematic section view along a scan line within the screen assembly.

A sectional view of screen assembly 106, as viewed from above through the center of a left-hand scan line, is shown in FIG. 4. The microlens elements are spaced apart by a distance $s_o$. Each lenslet is a positive (converging), lens, with its axis normal to the plane of microlens panel 315. Each lenslet can have, for example, a spherically curved surface and a circular, square, or other appropriate outer perimeter shape. Light 309 from projection system 300 falls on microlens panel 315 and is focused as a multiplicity of small "dots" 418 of diameter, d, on intermediate screen 316, which is parallel with microlens panel 315 and located at a distance, m, from the lenslet surface. The lateral dot spacing, $s_o'$, shown on intermediate screen 316 in FIG. 4 is slightly greater than the lenslet spacing $s_o$ due to spreading of projected light 309 from microlens panel 315, as illustrated in FIG. 4.

The analyzer panel 317 contains an array of blocking lines 419 of width, w, spaced apart laterally by a distance, s'. The blocking lines 419 can be, for example, vertical or slightly angled with respect to vertical (i.e., the angled blocking lines 419 appear in a zigzag manner on analyzer panel 317). Analyzer panel 317 is parallel with intermediate screen 316 and located at a distance T from intermediate screen 316.

The intermediate screen 316 can be made of ground glass or other media such as stretched paper (e.g., tracing paper). Due to its fibrous nature, paper has fibers lying in the plane of the paper which tend to scatter light in the forward direction; i.e., toward the eyes of the viewers.

Figure 5:
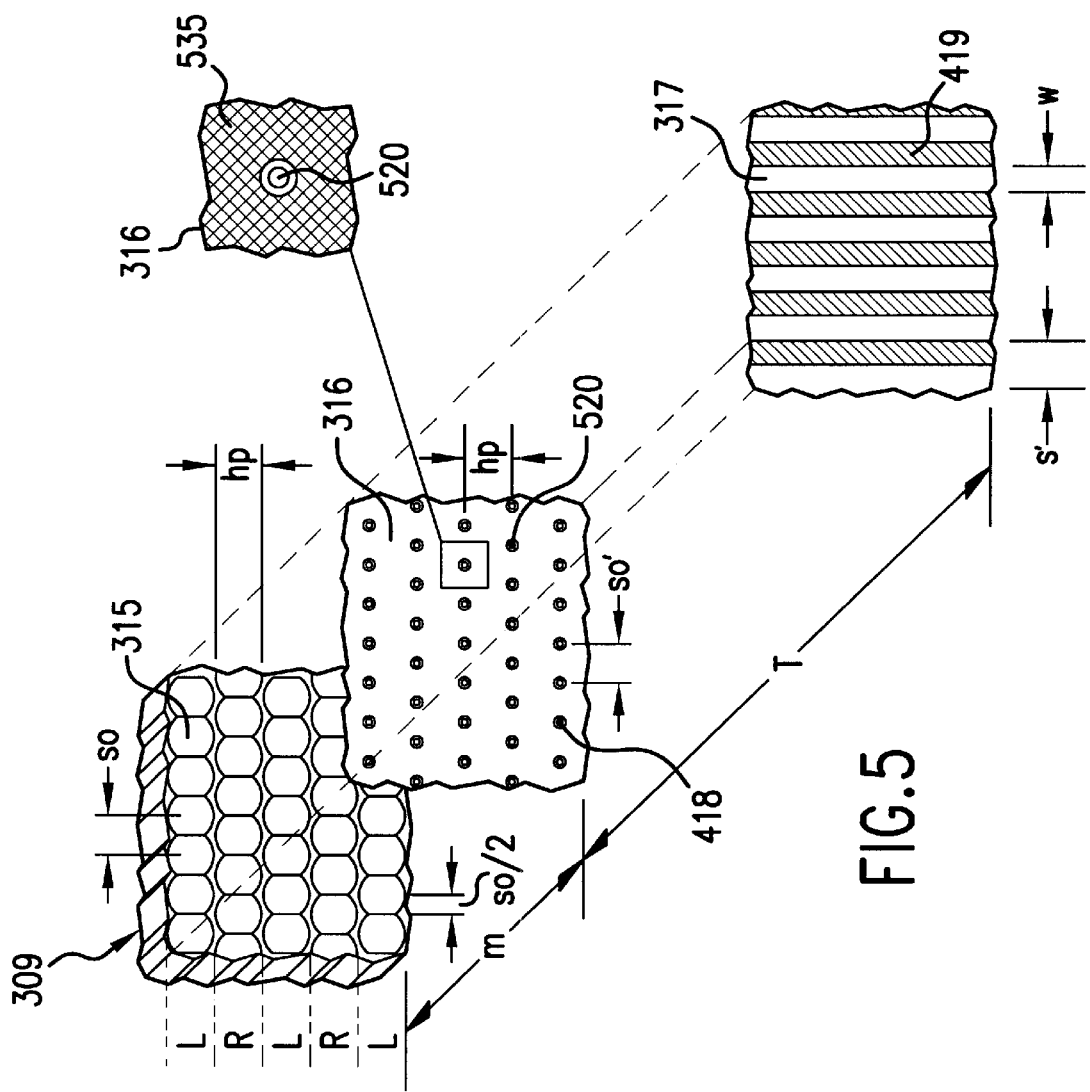
FIG. 5 shows an exploded view of the screen assembly shown in FIG. 4.

An isometric view of a small portion of screen assembly 106 is shown in FIG. 5. As depicted, every other row of lenslets is displaced laterally by a distance $s_o/2$. Note that each lenslet row is positioned to lie along a left- or right-hand scan line of LCD panel 312 as projected on microlens panel 315; $h_p$ is simply the scan line spacing on LCD panel 312 multiplied by the magnification, M, of projection system 300. Note microlens panel 315 and intermediate screen 316 change the video display from a rectangular to a "pointillist" presentation of video images, very similar to techniques employed in impressionist painting. Unlike impressionist painters who used different colors for each dot, however, microlens panel 315 and intermediate screen 316 merge the color of each pixel of LCD panel 312 to produce a dot having the requisite color and brightness. In FIG. 5, dots 418 and 520 correspond to left- and right-hand scan lines, respectively. For commonly-used vertical striping in LCD panels, color merging mitigates color diffraction phenomena which would otherwise occur when vertically-striped images are viewed through analyzer panel 317.

The dot diameter, d, (shown in FIG. 4) is much smaller than the openings, which are about $s_o/2$ wide, between lines 419 on analyzer panel 317.

The enlarged inset in FIG. 5 shows an optional thin opaque mask 535, with openings (i.e., apertures) centered with respect to dots 418 and 520, which serves to block scattered light from microlens panel 315. Mask 535 is attached to and becomes part of intermediate screen 316 in this embodiment of screen assembly 106.

The parameters of screen assembly 106 are defined as follows:

$$T = s_o' L/(2E), \quad (1)$$

$$s' = s_o'(1 - T/L). \quad (2)$$

The line width, w, may advantageously be chosen as $w = s_o/2$. In these equations, E is the interpupillary distance between the viewers eyes (about 2.5") and L is the distance from the viewers to intermediate screen 316.

Figure 6:
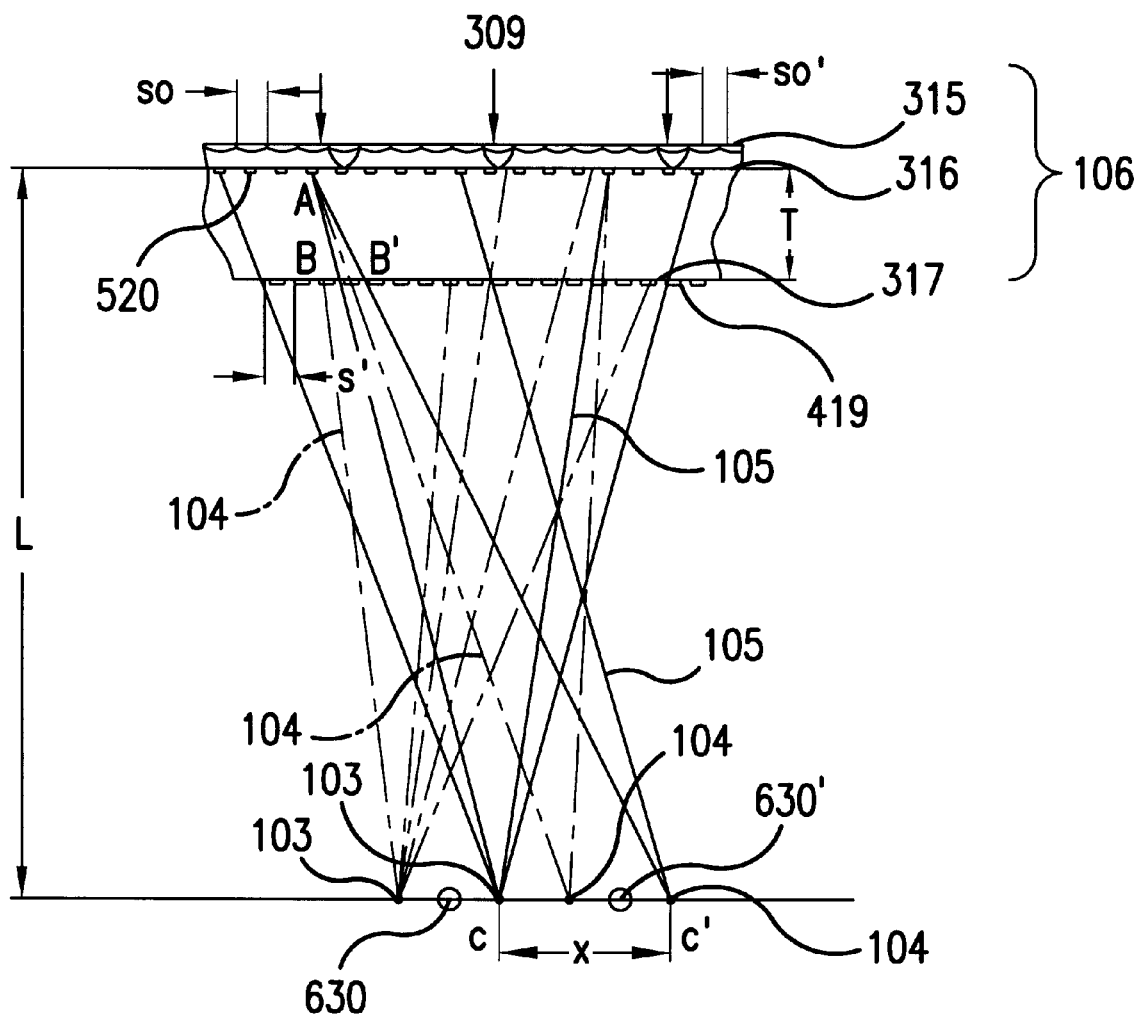
FIG. 6 is a view from above the autostereoscopic system including the screen assembly shown in FIG. 4.
Figure 7:
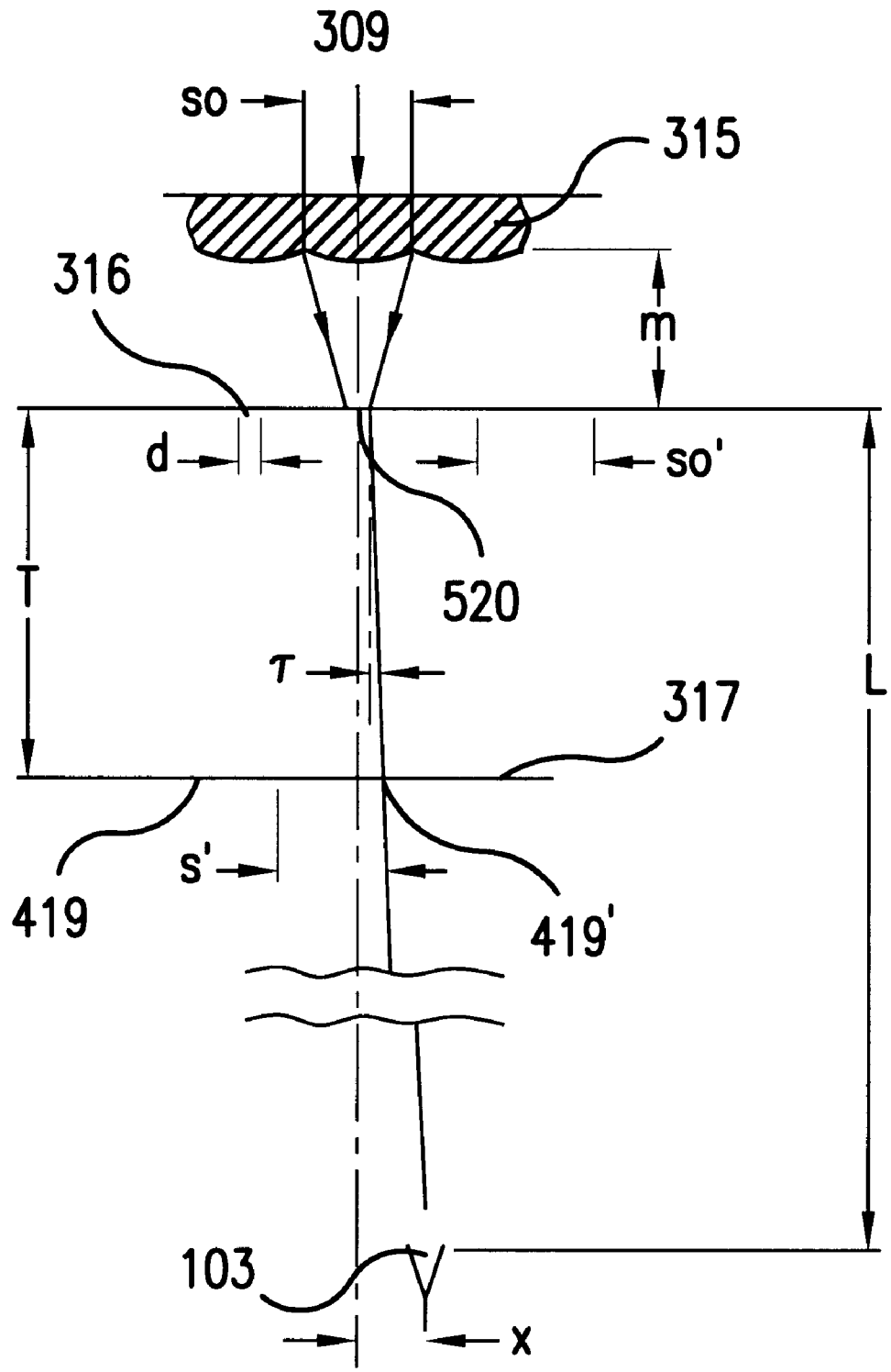
FIG. 7 is an enlarged view of a portion of FIG. 6, used in the analysis of the separation of left- and right-eye views of an autostereoscopic display, as provided by the screen assembly.
Figure 8:
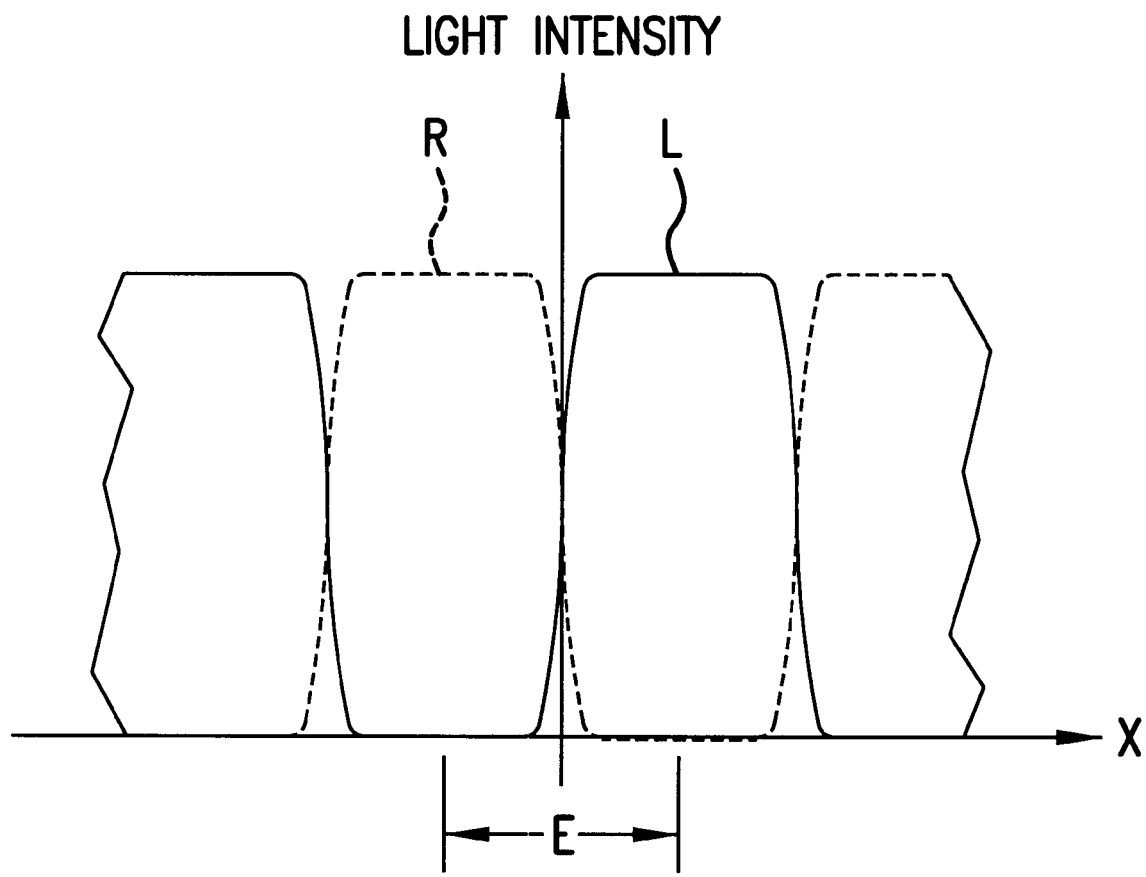
FIG. 8 shows the theoretical variation of light intensity of left- and right-eye views of a autostereoscopic display as the viewer moves to the left and right from a central viewing position.

Further details of the screen assembly and its function are illustrated in FIGS. 6–8. FIG. 6 is a top section view of screen assembly 106 and views from the horizontal prospective of the center of a scan line for right-hand scan line 520. Due to the large value of L (typically 84–96") relative to $s_o$ (around 0.03"), the entire projection system 300 cannot be shown in FIG. 6 at true scale. Because the geometry of the screen assembly 106 is based on mathematical relationships, however, the mathematical principle underlying the operation of projection system 300 can be better illustrated by making $s_o$ relatively large compared to L for illustrative purposes. FIG. 6 is the result of such modifications, made purely for illustrative purposes. The parameters shown in FIGS. 4 and 5 are included in FIG. 6.

The left and right eyes of the viewer are shown as points 103 and 104, respectively at two different locations 630 and 630'. As indicated in FIG. 6, the right eye of the viewer is able to see illuminated dots 520 while the view of these dots as seen by the left eye is blocked by vertical lines 419 on analyzer panel 317. For purposes of illustration, line AC from point C at the viewer's right eye 104 to dot 520 at point A on intermediate panel 316 is shown passing through the center B of the space between adjacent lines 419 on analyzer panel 317.

Screen assembly 106 enables the viewer to recapture the same stereoscopic view as that seen at the original position. Consider a shift of the viewer by a distance $x = (s'/s_o')(2E)$ from point C, placing the right eye at point C'. This relationship is immediately apparent from inspection of the figure by comparing the similar triangles ABB' and ACC', where B' is a point located at a distance s' to the right of point B. Thus, individual viewers can move to new positions from which they can obtain stereoscopic viewing. Furthermore, multiple viewers can be accommodated.

FIG. 7 provides further insight into the operation of screen assembly 106. FIG. 7 is an enlarged view of FIG. 6, illustrating the view of dot 520 as seen by the right eye of a viewer at distance L from intermediate screen 316. Let τ be the angle from the right-hand edge of dot 520 to the viewer's right eye for a viewer position which is shifted to the right from the central position shown in the figure. As the distance x from the central viewing position increases by movement to the right, a point will be reached when the right edge of dot 520 coincides with the left edge of line 419'. As the geometry of the figure illustrates, the angle τ' is defined by:

$$\tan(\tau') = (s' - w - d)/(2T). \quad (3)$$

The corresponding displacement of the viewer to the right from the central position is given by:

$$x = L\tan(\tau') = (s' - w - d)E/s_o', \quad (4)$$

using Eq. 1.

Because x is measured from the center position, the total movement possible without changing the view of the right eye, Δx, equals 2x. The view of the left eye will be blocked over the distance Δx (see also FIG. 6–9). Thus, the viewer can move laterally by a distance Δx with full separation of the left- and right-hand views of a stereoscopic display, where Δx is defined by:

$$\Delta x = 2(s' - w - d)E/s_o'. \quad (5)$$

Noting that s', $s_o$ and $s_o'$ are very nearly equal and setting $w = s_o/2$, a practical expression for Δx is:

$$\Delta x = (1 - 2d/s_o)E. \quad (6)$$

If d=w/3, a condition easily attainable by adjustment of the distance m (FIG. 4), the displacement Δx is very nearly equal to 2E/3 or 1.67".

To simplify both the analysis and discussion of the operation of the screen assembly, the right-eye view in FIG. 7 is assumed to be normal to intermediate screen 316, with the view for τ=0 corresponding to a point midway between adjacent lines 419 on 316. Oblique view lines as illustrated in FIG. 6 do not alter in a significant way the conclusions of the mathematical analysis given above.

Figure 9B:
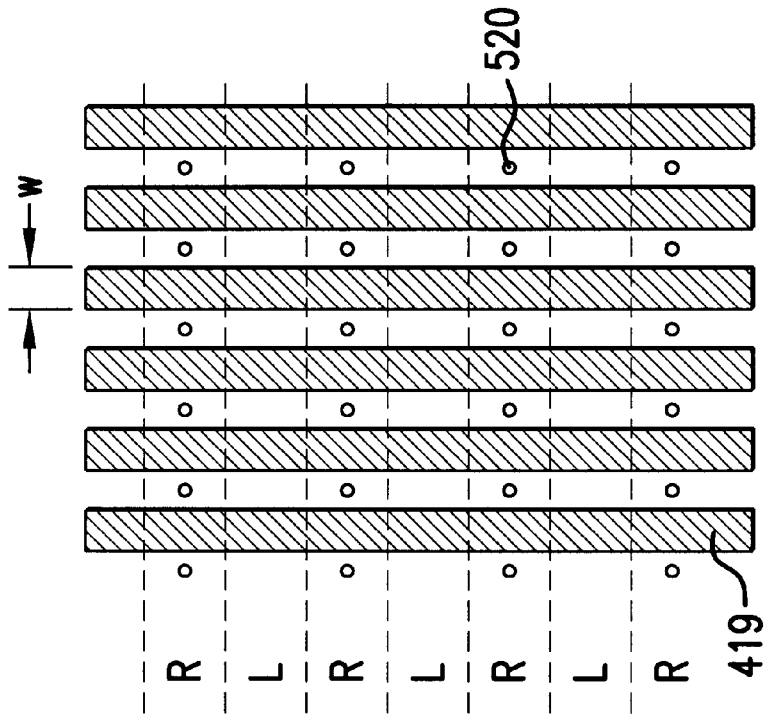
FIGS. 9A and 9B depicts left- and right-eye frontal views of an autostereoscopic display, showing the operation of the analyzing screen, used in conjunction with the lenslet panel and intermediate screen of the screen assembly.
Figure 9A:
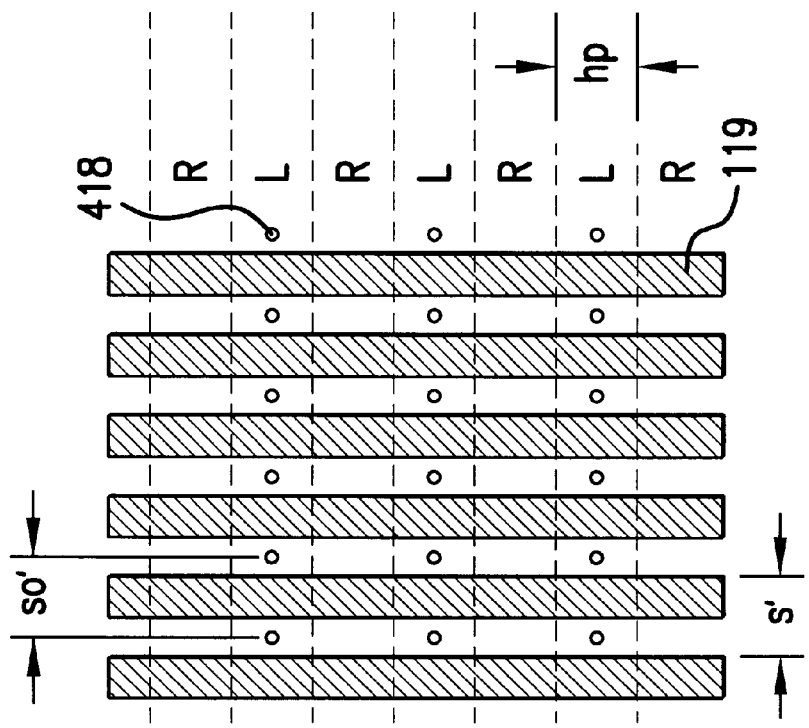

Consequently, the view as seen by the left eye is governed by the same mathematical relationships, but that the view is shifted by a distance E at the viewing location. Taking account of the occultation of dots 418 and 520 by lines 419, views of the display as seen by the left and right eyes are shown in FIG. 8 for $d/(s_o/2)=1/3$. (The view of the left eye is shown as a solid line and the right-eye view is shown as a dashed line.) FIGS. 9A and 9B display several views of a portion of intermediate screen 316 as seen by a viewer. The exploded view of FIG. 5 shows dots 418 and 520 on intermediate screen 316. FIGS. 9A and 9B are views of intermediate screen 316 as seen by a viewers left and right eyes, respectively. As indicated in these drawings, the dot diameter d is less than the spacing s'−w of the vertical lines 419 on analyzing panel 317, as viewed from a distance L. The views shown in FIG. 9 show dots 418 and 520 centered in spaces between adjacent lines 419, as also shown in FIG. 6. From the foregoing discussion, it is evident that this condition can be realized at particular viewer positions. (These greatly enlarged views are what a viewer might see by observing the 3-D display through a 10-power telescope.)

Although the above discussion applies to LCD panels, the discussion is also applicable to the Texas Instrument DLP (Digital Light Processing) system which employs reflected rather than transmitted light to produce an image. Reflected light from the DLP panel is projected to the selection screen 106 in the same way as for LCD panel 312.

Figure 10A:
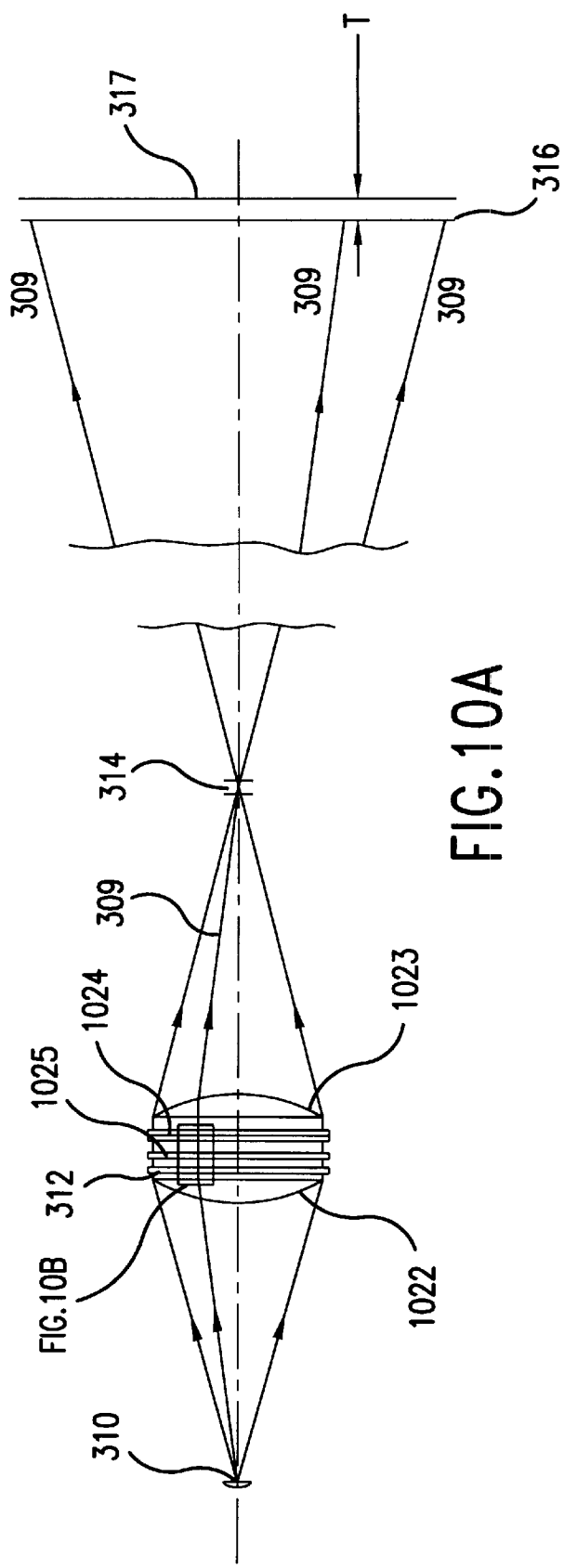
FIGS. 10A and 10B is a schematic view of an autostereoscopic projection system, according to another embodiment of the present invention.
Figure 10B:
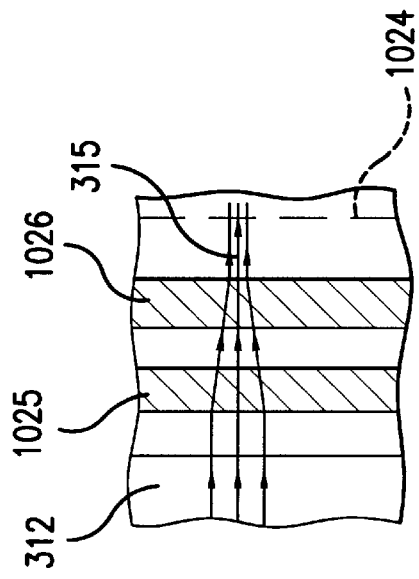

An alternative projection system is shown in FIGS. 10A and 10B. Referring to FIG. 10A, light from source/reflector 310 impinges on condenser lens 1022 which directs light along the optical axis through LCD panel 312, where the light encounters microlenses panels 1025/1026. Microlenses on microlens panels 1025/1026 are precisely aligned with horizontal scan lines on LCD panel 312. The configuration of lenslets is similar to the arrangement illustrated in FIGS. 4 and 5. A section view through lenslet panel 1025/1026 is shown in FIG. 10B. The converging lenslets on microlens panel 1025 focus light towards diverging lenslets on microlens panel 1026, which redirect individual light beams as narrowed "pencils" 309 along the optical axis. These pencil beams pass through opaque optional mask 1024, having small holes slightly larger than light pencils 309 to exclude stray radiation, and are then focused toward projection lens 1023. The projected dots are imaged on intermediate screen 316 and viewed through analyzing panel 317, as indicated in FIG. 10A.

B. Embodiments of Direct View Systems

In other embodiments of the present invention, solid-state flat panel monitors such as the Sony Plasmatron and the Fujitsu FPF21C8060UA-92 can be used. The screen assembly configuration is very similar to that shown in FIGS. 4 and 5. For direct-view systems, however, microlens panel 315 should be very thin to minimize light-scattering from the light source. (In this case, light 309 impinging on microlens panel 315 may be relatively diffuse as compared with the projection system.) Light scattering from scan-line to scan-line should be as small as possible.

Figure 11:
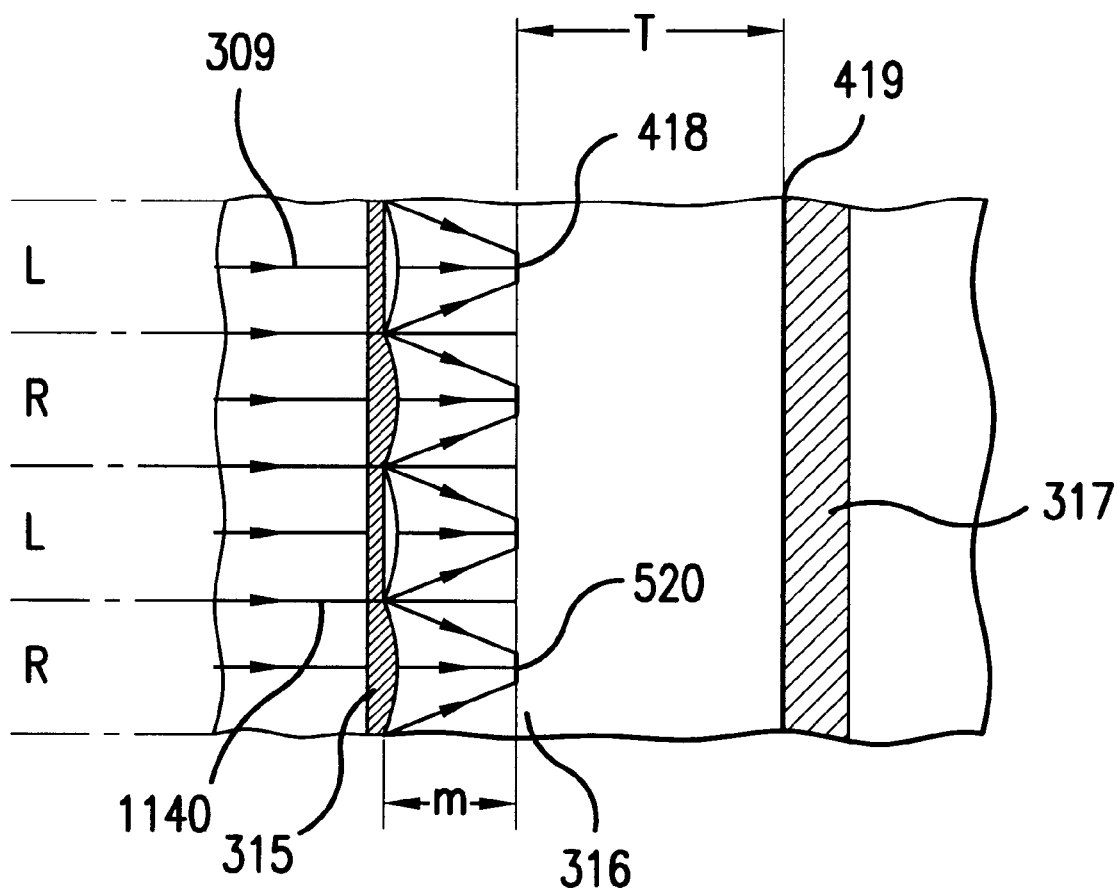
FIG. 11 is a transverse section view of a direct-view monitor adapted for use with the invention autostereoscopic system, according to an embodiment of the present invention.

If necessary, internal baffles 1140 such as those shown in FIG. 11 can be added to reduce scattering effects. FIG. 11 is a transverse section through a small portion of the monitor, taken through the center of right-hand lenslets, showing microlens panel 315 and baffles 1140, as well as intermediate screen 316 and analyzing panel 317. As depicted in FIG. 11, the baffles are normal to panel 315 and run laterally between adjacent scan lines. To protect the microlens panel 315, a relatively thick analyzing panel 317 is shown, with lines 419 on its inner surface. In all other respects, the screen assembly geometry is identical with that for projection systems.

C. Viewing Locations

As already noted, a number of lateral viewing locations are possible when viewers are located at the design distance L from screen 316. The autostereoscopic viewing system of the invention also accommodates viewers at other distances somewhat closer or further from the display. Viewers at substantially different average viewing distances, however, can also be accommodated as can be seen by the following analysis. From Eq. 1 and 2, it is found that:

$$s'=s_o'(1-T/L)=s_o'(1s_o'/(2E)), \text{ and} \qquad (7)$$

$$T/L=s_o'/(2E). \qquad (8)$$

Because $s_o$ (and hence $s_o'$) is fixed by the design of the autostereoscopic system, the ratio T/L is constant and the viewing distance can be changed merely by changing the spacing T of analyzing panel 317 relative to intermediate screen 316. (Note that $s_o=s_o'$ for a direct-view system.) This can be done with a precision mechanical shaft/gearing system with analyzing panel 317 is mounted on three interconnected threaded shafts so that rotation of a master shaft will be communicated by shafting to two threaded shafts to move analyzing panel 317, while keeping it parallel with intermediate screen 316.

D. Embodiments of Dynamic Autostereoscopic Viewing System

Figure 12:
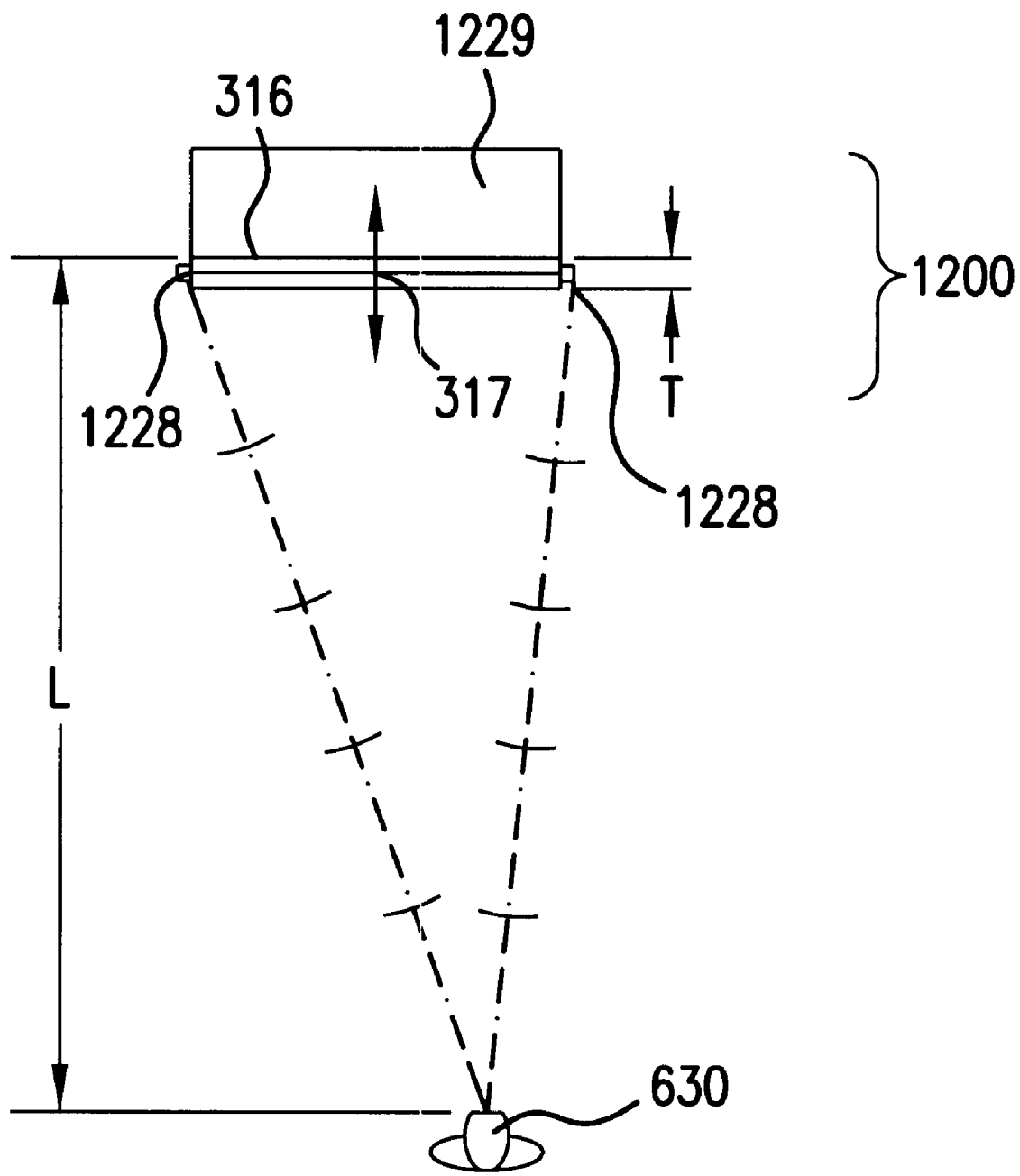
FIG. 12 illustrates an embodiment of the present invention for dynamic viewing of stereoscopic displays by a single viewer.

A single-viewer dynamic autostereoscopic viewing system can be achieved by using ultrasonic pulse signals to locate the head position of the viewer. Dynamic viewing system 1200, shown schematically in FIG. 12, is based on the fact that a continuous autostereoscopic view of a 3-D presentation can be achieved over a wide range of viewing positions by appropriate movements of analyzing panel 317. As viewer 630 moves closer or further from the display, Eq. 8 can be used to determine the value of T for each distance L. Also, as viewer 630 moves laterally, the lateral position of panel 317 can be adjusted to keep the angle τ=0 (FIG. 7).

To implement dynamic viewing system 1200, pulse generators 1228 (e.g., piezoelectric crystal units) are placed at each side of television monitor 1229. Ultrasonic ranging systems, including generator/receivers and associated electronics (pulse generators, digital timing circuits, output amplifiers, etc.) are used to detect the head position of the viewer. Control signals from the ranging system are then used drive servo systems to position analyzing panel 317 to keep T/L constant and to maintain τ=0. Both ultrasonic ranging systems and servo control systems of this type are well known in the art and they will not be described here in detail.

In operation, dynamic viewing system 1200 is engaged with viewer 630 at an initial position. Electronic signals from the ranging system will be set to the initial position and then locked. Subsequent movement of the viewer from the initial set-up position are detected by the ranging system and used to drive the servo control system to maintain constant values of T/L and τ. Before engaging the ranging system, while at the initial position, viewer 630 moves slightly from side-to-side while observing the display. The head position for τ=0 lies approximately midway between head positions which cause interchanging of the left- and right-eye views as indicated in FIG. 8. After locating this position, viewer 630 engages the ranging/servo system which locks-on and maintains the desired viewing parameters as the viewer moves around.

E. Fabrication of Lenslet Panels

In fabricating the lenslet panel, e.g., microlens panel 315 illustrated in FIGS. 4 and 5, the position of each lenslet must correspond very closely to the relative position of the corresponding pixel (or pixel element) on the monitor display (e.g., an LCD panel or a direct-view monitor). The required precision can be achieved by means of a special molding technique, which is illustrated in FIGS. 13A, 13B and 13C.

The principle underlying the technique is to use a flat transparent panel 1343 (either plate glass or plastic) to support a thin layer of cured transparent molding resin 1345. The molding assembly 1300 (shown in FIGS. 13A and 13B) includes a metal mold 1340 precisely machined (e.g., by using a computerized numerical control (CNC) machine) to produce the inverse of lenslet array of the lenslet panel. A close-fitting frame 1341 is used the confine molding resin 1345 during the curing period. A number of relief cutouts 1342 in frame 1341 (see also section view, FIG. 13B) allow for excess accumulation of resin 1345. The backing plate 1343 is supported during initial curing by pins 1344.

The lenslet panel is produced by first preparing molding resin 1345 (e.g., Hysol system: TE 6175/HD 3561), taking care to avoid dust contamination and to de-air the resin. An appropriate amount of molding resin 1345 is poured into mold 1340 with pins 1344 installed. The technique shown in FIG. 13C can be used to avoid air entrapment between resin 1345 and mold 1340. Mold assembly 1300 is tipped slightly, causing molding resin 1345 to flow to the left edge of mold 1340 as shown in FIG. 3C; plate 1343 is lowered to contact pins 1344 along the left edge, the plate being raised and supported at its right edge. The tipped mold assembly and plate are then slowly lowered until mold assembly 1300 is horizontal and the plate comes into contact with right-hand pins 1344. Molding resin 1345 is then allowed to gel. After jelling, pins 1344 are retracted and the resin is allowed to cure fully, for example, at room temperature. Note that shrinkage during final curing occurs through the thickness of the resin, preventing voids during the final curing process.

It should, of course, be understood that while the present invention has been described in reference to particular system configurations and processes, other system configurations and processes should be apparent to those of ordinary skill in the art. For example, embodiments of the present invention modified to be compatible with existing NTSC standards as well as the forthcoming ACATS standards for television and computer monitors. Embodiments of the present invention enables simultaneous viewing of 3-D displays by multiple observers, for example, more than three viewers. Embodiments of the present invention enable large 3-D displays; e.g., 40–50", by using suitable monitor panels to preserve high definition.

Note that resolution of embodiments of the present invention can be compared to that of a high-resolution computer monitor. For example, a high-quality dot-trio computer monitor might employ a dot pitch of 0.28 mm (about 0.011"). By comparison to an embodiment of the present invention, a 27" VGA display with 640 horizontal pixels will have a pixel spacing of about 0.034": taking into account that the 3-D display of the invention will be viewed from a distance of about 84" or more, the angle between dots subtended at the eye of the viewer is on the order of 0.023°, as compared with 0.026° for a person viewing the computer screen at a distance of 24". Although every other line of the 3-D display is seen by each eye, the entire screen is seen by both eyes; also, each dot for the left eye view lies midway between dots for the right eye displayed immediately above and below the left eye dot and vice versa.

What is claimed:

1. A screen assembly for allowing a viewer, having an interpupillary distance E and being located a distance L from an intermediate screen of said screen assembly, to view stereoscopic images displayed on a video display having interlaced scan lines extending in a horizontal direction and interlaced in a vertical direction, where alternating scan lines carry left eye and right eye information, said screen assembly comprising:

a first panel having a first set of lenslet rows and a second set of lenslet rows, the first set of lenslet rows being interleaved with the second set of lenslet rows by an offset $s_o/2$, each lenslet row having a plurality of lenslets, each lenslet having a width $s_o$ in a horizontal direction and a height $h_p$ in a vertical direction, the height $h_p$ corresponding to a height of one scan line of the video display;

said intermediate screen disposed a spacing m in a depth direction that is orthogonal to the vertical direction and the horizontal direction, said first panel being disposed between said intermediate screen and the video display, a plurality of dots being formed on said intermediate screen by the lenslets of said first panel focussing the stereoscopic images of the video display, adjacent dots being separated by a spacing $s_o'$; and a second panel disposed a spacing T in the depth direction and having a first optical transmittance, said intermediate screen being disposed between said second panel and said first panel, said second panel having therein a set of lines having a second smaller optical transmittance, said set of lines (i) having a width w in the horizontal direction, and (ii) being equally spaced from one another in the horizontal direction by a spacing s', dimensions of said screen assembly satisfying the equations:

$s'=s_o'(1-T/L)$, $T=s_o'L/(2E)$, $w=s_o/2$.

2. The screen assembly of claim 1, wherein said intermediate screen is a ground-glass screen.

3. The screen assembly of claim 1, wherein said intermediate screen is a stretched paper screen.

4. The screen assembly of claim 1, wherein said intermediate screen includes a mask having a plurality of apertures.

5. The screen assembly of claim 1, wherein said first panel includes a plurality of baffles arranged along the depth direction on the surface of said first panel facing the video display, a baffle from the plurality being arranged laterally between adjacent lenslet rows of said first panel.

6. The screen assembly of claim 1, further comprising a gearing spacer connected between said intermediate screen and said second panel.

7. The screen assembly of claim 1, further comprising:

an ultrasound sensor determining the location of the viewer;

means for varying spacing between said intermediate screen and said second panel, said varying means being coupled to said ultrasound sensor, said varying means varying the panel spacing between said intermediate screen and said second panel based on the location of the viewer as determined by said ultrasound sensor.

8. The screen assembly of claim 1, wherein at least one lenslet from the first set of lenslet rows from said first panel has a circular-shaped outer edge.

9. The screen assembly of claim 1, wherein at least one lenslet from the first set of lenslet rows from said first panel has a square-shaped outer edge.

10. The screen assembly of claim 1, wherein a lateral displacement of the viewer by a distance x restores original stereoscopic view, the distance x being substantially equal to $(s'/s_o)(2E)$.

11. A stereoscopic display system, comprising:

a video monitor having a plurality of interlaced scan lines extending in a horizontal direction and alternating in a vertical direction, where alternating scan lines carry left eye and right eye information, respectively, and a screen assembly operatively located between said monitor and a viewer having an interpupillary distance E and being located a distance L from an intermediate screen of said screen assembly, said screen assembly including:

a first panel having a first set of lenslet rows and a second set of lenslet rows, the first set of lenslet rows being interleaved with the second set of lenslet rows by an offset $s_o/2$, each lenslet row having a plurality of lenslets, each lenslet having a width $s_o$ in a horizontal direction and a height $h_p$ in a vertical direction, the height $h_p$ corresponding to a height of one scan line of the video monitor;

said intermediate screen disposed a spacing m in a depth direction that is orthogonal to the vertical direction and the horizontal direction, said first panel being disposed between said intermediate screen and the video monitor, a plurality of dots being formed on said intermediate screen by the lenslets of said first panel focussing a stereoscopic image displayed by the video monitor, adjacent dots being separated by a spacing $s_o'$; and a second panel disposed a spacing T in the depth direction and having a first optical transmittance, said intermediate screen being disposed between said second panel and said first panel, said second panel having therein a set of lines having a second smaller optical transmittance, said set of lines (i) having a width w in the horizontal direction, and (ii) being equally spaced from one another in the horizontal direction by a spacing s', dimensions of said screen assembly satisfying the equations:

$s'=s_o'(1-T/L),$ $T=s_o'L/(2E),$ $w=s_o/2.$

12. The stereoscopic display system of claim 11, wherein said video monitor receives and displays the NTSC standard.

13. The stereoscopic display system of claim 11, wherein said video monitor receives and displays the PAL standard.

14. The stereoscopic display system of claim 11, wherein said intermediate screen is a ground-glass screen.

15. The stereoscopic display system of claim 11, wherein said intermediate screen is a stretched paper screen.

16. The stereoscopic display system of claim 11, wherein said intermediate screen includes a mask having a plurality of apertures.

17. The stereoscopic display system of claim 11, wherein said first panel includes a plurality of baffles arranged along the depth direction on the surface of said first panel facing the video monitor, a baffle from the plurality being arranged laterally between adjacent lenslet rows of said first panel.

18. The stereoscopic display system of claim 11, further comprising a gearing spacer connected between said intermediate screen and said second panel.

19. The stereoscopic display system of claim 11, further comprising:

an ultrasound sensor determining the location of the viewer;

means for varying spacing between said intermediate screen and said second panel, said varying means being coupled to said ultrasound sensor, said varying means varying the panel spacing between said intermediate screen and said second panel based on the location of the viewer as determined by said ultrasound sensor.

20. The stereoscopic display system of claim 11, wherein at least one lenslet from the first set of lenslet rows from said first panel has a circular-shaped outer edge.

21. The stereoscopic display system of claim 11, wherein at least one lenslet from the first set of lenslet rows from said first panel has a square-shaped outer edge.

22. The stereoscopic display system of claim 11, wherein a lateral displacement of the viewer by a distance x restores original stereoscopic view, the distance x being substantially equal to $(s'/s_o)(2E)$.

* * * * *